H. THOMAS.
HOLDER FOR TAPS, REAMERS, DIES, AND THE LIKE.
APPLICATION FILED JUNE 7, 1920.

1,436,369.

Patented Nov. 21, 1922.

Witness:
R. F. Farrington

Inventor:
Henry Thomas
By Charles M. Nissen, Atty.

Patented Nov. 21, 1922.

1,436,369

UNITED STATES PATENT OFFICE.

HENRY THOMAS, OF EAST HAM, ENGLAND.

HOLDER FOR TAPS, REAMERS, DIES, AND THE LIKE.

Application filed June 7, 1920. Serial No. 387,215.

*To all whom it may concern:*

Be it known that I, HENRY THOMAS, a subject of the King of England, residing at 144 Clements Road, East Ham, in the county of Essex, England, have invented certain new and useful Improvements in Holders for Taps, Reamers, Dies, and the like, of which the following is a specification.

This invention has for its object the provision of a device of the class named which shall be of improved construction and operation.

The invention is exemplified in the combination and arrangement of parts shown in the accompanying drawing and described in the following specification, and it is more particularly pointed out in the appended claims.

In the drawing—

Figure 1:
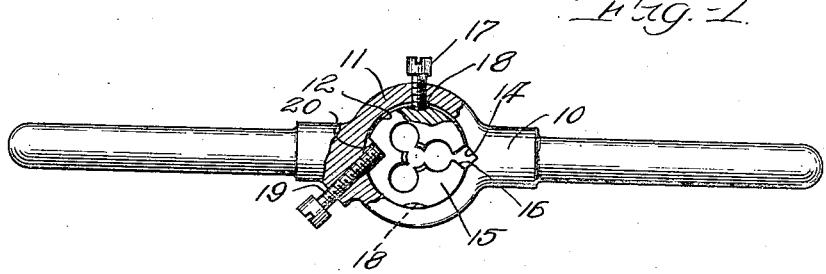
Fig. 1 is a plan view with parts in section showing one embodiment of the present invention.

In the construction shown in Fig. 1 the numeral 10 designates a stock having an enlarged portion 11 provided with a circular recess 12. A flange 13, Fig. 2, projects inwardly from the periphery of the recess 12 at one side of the stock to form a rim about the periphery of the recess. A notch 14 is formed in the wall of the recess for a purpose to be described. A die 15 fits within the recess 12 and is provided with a notch 16 which divides the die into two parts which may be resiliently moved slightly relative to one another. The die 15 may be held in place in the recess 12 by a radially disposed screw 17 which enters depressions 18 in the periphery of the die, or, the die may be held in place by a tangentially arranged screw 19 which bears against one of the faces of a right angular notch 20 cut in the periphery of the die. When it is desirable to use the tool for holding a tap or reamer or other tool provided with a square shank the end of the shank is inserted in the opening formed by the notches 14 and 16. The opening may be tightened upon the shank by either of the screws 17 or 19. If the screw 17 is tightened the two halves of the die 15 are sprung toward one another to cause the notch 16 to close up the tool shank. If the screw 19 is tightened the die 15 is slightly rotated in the recess 12 so that the notch 16 is shifted relative to the notch 14, and thus the shank of the tool is clamped between opposite faces of the two cooperating notches.

The tightening of the screw 17 may also be used for adjusting the screw-cutting faces of the die 15 as it will be apparent that when the two parts of the die are moved toward one another by tightening the screw 17 the diameter of the opening between the screw-cutting faces of the die will be slightly lessened. If the die is rotated to bring the notch 16 in alignment with the screw 17 and the screw then forced into the notch 16 it will act as a wedge and spread the sides of the die, thus slightly enlarging the diameter of the opening between the screw-cutting faces of the die.

The tool may be made to provide for a larger range in the sizes of tool shanks which it will accommodate by substituting for the die 15 a disc 21 having a plurality of notches 22 of various sizes formed in its periphery. By bringing different ones of the notches 22 into cooperative relation with the notch 14 it will be apparent that a considerable range in the size of the opening for the tool shanks will be provided. The screw 19 may be used in conjunction with the disc 21 for tightening the holder upon the shank of a tool held thereby.

Figure 2:
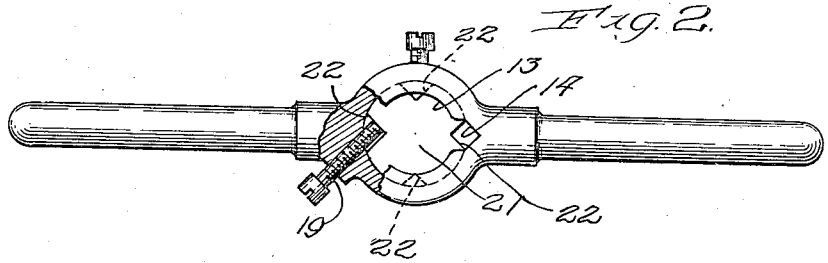
Fig. 2 is a view similar to Fig. 1 showing a different form of holding member in the die stock.
Figure 3:
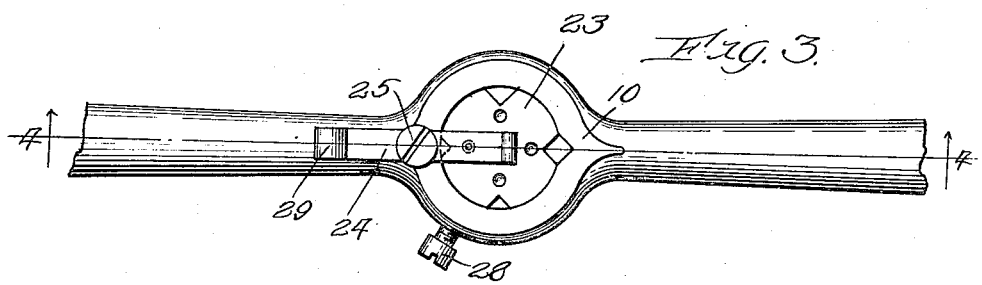
Fig. 3 is a plan view of a somewhat modified form of the invention.
Figure 4:
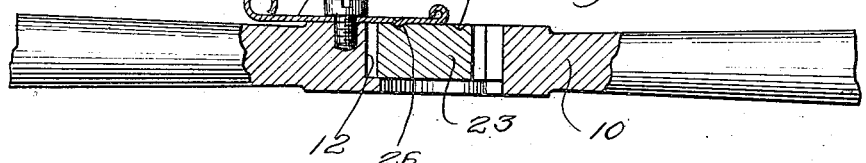
Fig. 4 is a side view of the device shown in Fig. 3 with parts in section.

In the form of the invention shown in Figs. 3 and 4 the general construction of the stock 10 is similar to that previously described, and a disc 23 is placed in the recess 12 in the manner described in connection with Fig. 2. The disc 23 is retained in the recess by a pivoted spring plate 24 secured to the stock 10 by a screw 25 and having a boss 26 struck downwardly in one arm thereof. The upper face of the disc 23 is provided with one or more depressions 27 into which the boss 26 projects to hold the disc in place and to hold it in its various positions of adjustment in the stock 10. The stock 10 may be provided also with one or more set screws 28 for locking the disc 23 in the recess 12. The end of the spring plate 24 is turned upwardly, as shown at 29, to provide a handle by which the plate may be turned to permit the disc 23 to be moved into and out of position in the recess 12. It will be apparent that the holder shown in Figs. 1 and 2 may also be provided with a plate similar to that shown at 24 in Figs. 3 and 4 and that this plate may be used in conjunction with a die like that shown at 15, as well as with a solid disc having a notched periphery.

I claim:—

1. A tool holder having a recess and a notch in the periphery of said recess, a split member within said recess the parts whereof which are separated by the split therein form the sides of a notch arranged to cooperate with the notch in the periphery of said recess, and means for holding said split member in position in said recess.

2. A tool holder having a recess therein provided with a notch in the periphery thereof, a radially split die arranged within said recess the portions of which die at opposite sides of the split therein form the sides of a notch arranged to cooperate with the notch in the periphery of said recess, and means for adjusting the portions of said die relative to one another.

3. A tool holder comprising a stock having a recess therein and a notch in the periphery of said recess, a screw-cutting die arranged within said recess and having a notch with angularly disposed sides in the periphery thereof which separates said die into two portions resiliently movable relative to one another, and a screw threaded in said stock and arranged to bear against said die to adjust the portions of said die relative to one another.

4. A tool holder comprising a stock having a recess therein provided with a notch in the periphery thereof, a member rotatively mounted within said recess and having a notch in the periphery thereof arranged to register with the notch in the periphery of said recess, and means for rotating said member within said recess to shift said notches relative to one another to cause the sides thereof to clamp a tool held in said notches.

5. A tool holder comprising a stock having a recess, a member rotatably positioned in said recess, registering notches in said stock and member, and a screw theaded in said stock and bearing against said member to rotate said member in said recess to shift said notches relative to one another.

6. A tool holder comprising a stock having a recess therein, a member rotatably positioned within said recess, a spring retaining means pivotally mounted on said stock and having a portion thereof arranged to engage said member to retain said member in said recess, and cooperating portions formed on said stock and member for engaging a tool to be held thereby.

In testimony whereof I have signed my name to this specification on this 18th day of May, A. D. 1920.

HENRY THOMAS.